US012788038B2

(12) United States Patent
Ahn

(10) Patent No.: US 12,788,038 B2
(45) Date of Patent: Nov. 10, 2026

(54) VEGETABLE FERMENTED BLOOD FLAVOR SEASONING COMPOSITION FOR VEGETABLE SUBSTITUTE MEAT

(71) Applicant: Millennial Flavor Town Cooperation Foundation, Seoul (KR)

(72) Inventor: Bakrin Ahn, Iksan-si (KR)

(73) Assignee: Millennial Flavor Town Cooperation Foundation, Seoul (KR)

( * ) Notice: Subject to any disclaimer, the term of this patent is extended or adjusted under 35 U.S.C. 154(b) by 360 days.

(21) Appl. No.: 18/515,044

(22) Filed: Nov. 20, 2023

(65) Prior Publication Data

US 2024/0172784 A1 May 30, 2024

(30) Foreign Application Priority Data

Nov. 28, 2022 (KR) ........................ 10-2022-0161684

(51) Int. Cl.
*A23L 27/10* (2016.01)
*A23L 31/00* (2016.01)

(52) U.S. Cl.
CPC ............... *A23L 27/10* (2016.08); *A23L 31/00* (2016.08)

(58) Field of Classification Search
CPC ................................. A23L 27/50; A23L 27/24
See application file for complete search history.

(56) References Cited

U.S. PATENT DOCUMENTS

2022/0022500 A1* 1/2022 Cho ........................ A23L 23/00

FOREIGN PATENT DOCUMENTS

KR 20140135041 A 11/2014

OTHER PUBLICATIONS

Guo et al. CN 103445128 Machine Translation 2013 (Year: 2013).*
Kim KR 20030009782 Machine Translation 2003 (Year: 2003).*
Lee et al. (KR 2015055668) (Year: 2015).*
Myungsoon KR 2016067347 2016 (Year: 2016).*
Nam KR 20050073940 2005 Machine Translation (Year: 2005).*
Song et al. CN 1063605 Machine Translation 1992 (Year: 1992).*
Wang CN 109805352 Machine Translation (Year: 2019).*
Yoon et al. WO 2015093664 Machine Translation (Year: 2015).*
Yu CN 103734669 Machine Translation (Year: 2013).*

* cited by examiner

*Primary Examiner* — Felicia C Turner
(74) *Attorney, Agent, or Firm* — NKL Law; Jae Youn Kim

(57) ABSTRACT

A method for preparing a seasoning composition, which includes preparing preliminary fish sauce by performing preliminary fermentation of a preliminary mixture including mushrooms, salt, soy sauce, yeast, and water; separating a liquid-phase and a solid content from the preliminary fish sauce and performing primary fermentation of a first mixture including the solid content of the preliminary fish sauce, spring onion roots, and water to prepare first fish sauce; separating a liquid-phase and a solid content from the first fish sauce and drying the solid content of the first fish sauce; and mixing the solid content of the dried first fish sauce, the liquid-phase of the preliminary fish sauce, the liquid-phase of the first fish sauce, and an extracted beet juice, and subjecting the mixture to ageing.

12 Claims, 1 Drawing Sheet

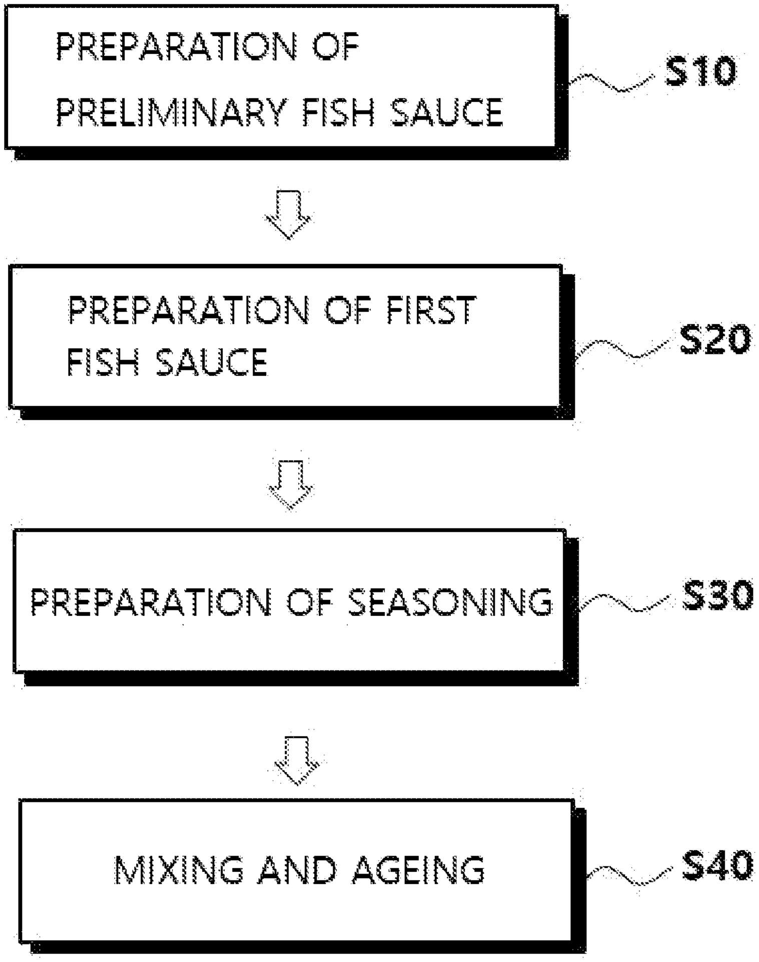
PREPARATION OF PRELIMINARY FISH SAUCE
S10
PREPARATION OF FIRST FISH SAUCE
S20
PREPARATION OF SEASONING
S30
MIXING AND AGEING
S40

VEGETABLE FERMENTED BLOOD FLAVOR SEASONING COMPOSITION FOR VEGETABLE SUBSTITUTE MEAT

CROSS-REFERENCE TO RELATED APPLICATION

This application claims priority to Korean Patent Application No. 10-2022-0161684 filed on Nov. 28, 2022, and all the benefits accruing therefrom under 35 U.S.C. § 119, the entire contents of which are incorporated by reference in their entirety.

BACKGROUND

The present invention relates to a method for preparing seasoning composition, and more particularly, to a method for preparing a vegetable fermented blood flavor seasoning composition that can express the taste of animal meat.

Excessive consumption of animal meat can cause various adult diseases such as obesity, hyperlipidemia, arteriosclerosis, and fatty liver disease. Additionally, the vegetarian craze has begun to spread around the world, and the number of vegetarians from children to adults is increasing. Following this trend, the market related to vegetable substitute meat as a substitute for animal meat is growing at a rapid pace.

Substitute meat (meat analogue, meat alternative, meat substitute, mock meat, faux/fake meat, imitation meat, vegetarian meat, or vegan meat) is a food material prepared from plant-based ingredients with a shape and a texture similar to those of meat.

Substitute meat has a texture similar to that of animal meat, easily absorbs moisture, and provides proteins without cholesterol. In addition, it has an advantage in that it provides an excellent nutritional value as it is rich in fiber, vitamins, and minerals that are lacking in animal meat. Moreover, the digestion time is shorter than that of meat, and thus there is less stress on the stomach and intestines. Accordingly, various studies on the use such substitute meat have recently been conducted.

For example, Korean Patent Application Publication No. 10-2014-0135041 discloses a food composition containing rice and mushrooms. However, to date, technology has been limited to improving the heterogeneity of vegetable proteins by simply replacing animal meat components with vegetable protein components, and there are limitations in reproducing texture, juiciness of meat, and sensuality similar to those of animal meat.

Meanwhile, many studies are underway showing that fermenting mushrooms increases the contents of nucleotides (e.g., GMP, 5-guanylic acid) and amino acid (e.g., glutamate), thereby enhancing umami and meat flavor; therefore, there have recently been increasing attempts to use the same as alternative meat.

PRIOR ART DOCUMENT

Patent Document

Korean Patent Application Publication No. 10-2014-0135041

SUMMARY

The present invention provides a method for preparing a seasoning composition that can express the blood flavor and savory flavor of animal meat using vegetable materials.

The present invention provides a method for preparing a seasoning composition that provides a savory flavor similar to that of animal meat.

The method for preparing a seasoning composition, according to embodiments, may include preparing preliminary fish sauce by performing preliminary fermentation of a preliminary mixture including mushrooms, salt, soy sauce, yeast, and water; separating a liquid-phase and a solid content from the preliminary fish sauce and performing primary fermentation of a first mixture including the solid content of the preliminary fish sauce, spring onion roots, and water to prepare a first fish sauce; separating a liquid-phase and a solid content from the first fish sauce and drying the solid content of the first fish sauce; and mixing the solid content of the dried first fish sauce, the liquid-phase of the preliminary fish sauce, the liquid-phase of the first fish sauce, and an extracted beet juice, and subjecting the mixture to ageing.

In an embodiment, the preliminary mixture may be prepared by mixing mushrooms, salt, soy sauce, and yeast and then adding water thereto.

In an embodiment, the preliminary fermentation may be performed at room temperature for 2 months to 6 months.

In an embodiment, the mushrooms may include one or more selected from oyster mushroom, button mushroom, king oyster mushroom, enoki mushroom, and shiitake mushroom.

In an embodiment, the preliminary mixture may further include one or more selected from paprika and bell pepper.

In an embodiment, the first mixture may be prepared by mixing the solid content of the preliminary fish sauce and spring onion roots and then adding water thereto.

In an embodiment, the primary fermentation may be performed at room temperature for 0.5 month to 3 months.

In an embodiment, the drying may be performed at 35° C. to 50° C. for 35 hours to 60 hours.

In an embodiment, the seasoning composition may include 500 parts by weight to 800 parts by weight of the liquid-phase of the preliminary fish sauce, 500 parts by weight to 800 parts by weight of the liquid-phase of the first fish sauce, and 500 parts by weight to 800 parts by weight of the beet juice based on 100 parts by weight of the seasoning.

In an embodiment, the ageing may be performed at 10° C. to 20° C. for 1 month to 5 months.

In an embodiment, the preparation of the seasoning composition may include, before the drying, mixing the solid content of the first fish sauce with a second mixture including beets, salt, iron, soy sauce, yeast, and water, and performing a secondary fermentation to prepare second fish sauce; separating the liquid-phase and solid content from the second fish sauce; and drying the solid content of the second fish sauce, wherein the ageing may include mixing the solid content of the dried second fish sauce, the liquid-phase of the preliminary fish sauce, the liquid-phase of the second fish sauce, and an extracted beet juice; and subjecting the mixture to ageing.

In an embodiment, the preparation of seasoning may include, before the drying, mixing the solid content of the first fish sauce with a third mixture including the liquid-phase of the preliminary fish sauce, spring onion roots, and water, and subjecting the resulting mixture to a tertiary fermentation to prepare a third fish sauce; separating the liquid-phase and solid content from the third fish sauce; and drying the solid content of the third fish sauce, wherein the ageing may include mixing the solid content of the dried third fish sauce, the liquid-phase of the preliminary fish sauce, the liquid-phase of the third fish sauce, and an extracted beet juice; and subjecting the mixture to ageing.

In particular, the second fish sauce and the third fish sauce may selectively be included and thereby the savory flavor, color, etc. of the seasoning may be adjusted.

The technical solutions to the technical problems above do not enumerate all of the features of the present invention. The various features of the present invention and the resulting advantages and effects thereof may be understood in more detail by referring to the specific exemplary embodiments below.

BRIEF DESCRIPTION OF THE DRAWINGS

FIG. 1 is a brief schematic illustration of a preparation method of a seasoning composition according to an embodiment.

DETAILED DESCRIPTION OF EMBODIMENTS

Hereinafter, the principles of preferred embodiments of the present invention will be described in detail with reference to the accompanying drawings and description. However, the drawings shown below and the description below relate to preferred implementation methods among various methods for effectively explaining the features of the present invention, and the present invention is not limited to only the drawings and description below.

Meanwhile, terms such as first and second may be used to describe various components, but these terms should be interpreted only for the purpose of distinguishing one component from another. For example, a first component may be named a second component, and similarly, a second element may be named a first element.

Singular expressions include plural expressions unless the context clearly dictates otherwise. In the present specification, terms such as "include" and "have" are intended to designate that the described feature, number, step, operation, component, part, or a combination thereof exists, and it should not be understood that the presence or addition of one or more other features or numbers, steps, operations, components, parts, or combinations thereof is not precluded.

Unless defined otherwise, all of the terms used herein, including technical or scientific terms, have the same meaning as commonly understood by one of ordinary skill in the art. Terms such as those defined in commonly used dictionaries should be interpreted as having a meaning consistent with the meaning in the context of the related art, and unless explicitly defined in the present specification, they should not be interpreted in an ideal or overly formal meaning.

Hereinafter, the method for preparing the seasoning composition of the present invention will be described in detail.

The method for preparing a seasoning composition according to the present invention includes preparing preliminary fish sauce by performing preliminary fermentation of a preliminary mixture including mushrooms, salt, soy sauce, yeast, and water; separating a liquid-phase and a solid content from the preliminary fish sauce and performing primary fermentation of a first mixture including the solid content of the preliminary fish sauce, spring onion roots, and water to prepare a first fish sauce; separating a liquid-phase and a solid content from the first fish sauce and drying the solid content of the first fish sauce; and mixing the solid content of the dried first fish sauce, the liquid-phase of the preliminary fish sauce, the liquid-phase of the first fish sauce, and an extracted beet juice, and subjecting the mixture to ageing. When the seasoning composition prepared in this way is used for vegan food, a blood flavor and a savory flavor close to actual animal meat may be provided.

Hereinafter, each step of the preparation method of the seasoning composition of the present invention will be described in detail.

FIG. 1 is a brief schematic illustration of a preparation method of a seasoning composition according to an embodiment.

First, a preliminary fish sauce may be prepared by preliminary fermentation of a preliminary mixture including mushrooms, salt, soy sauce, yeast, and water (Step S10).

Mushrooms included in the preliminary mixture may be, for example, oyster mushroom, button mushroom, king oyster mushroom, enoki mushroom, and shiitake mushroom. For example, the mushrooms may include two or more types of mushrooms, such as oyster mushroom, button mushroom, and king oyster mushroom. By including two or more types of mushrooms, it is possible for the mushrooms to impart a subtle taste and aroma when applied to food. Furthermore, mushrooms may provide abundant fiber and are rich in vitamins, proteins, calcium, dietary fiber, beta glucan, etc.

In an embodiment, it is most preferable that oyster mushroom and king oyster mushroom be mixed, and in particular, oyster mushroom and king oyster mushroom may be mixed in a mass ratio of 4:6 to 6:4. In contrast, in the case where button mushroom is included, it may be mixed in a ratio of 1/3 times to 1/2 times the content of oyster mushroom or king oyster mushroom.

Since each mushroom has a different level of aroma, savory flavor, intensity, etc., it is preferable that each mushroom be separated and undergo a process being chopped, dried, etc., and then the resultant of each mushroom be mixed.

The salt is preferably roasted salt, and the roasted salt may be roasted or baked at a high temperature, for example, 400° C. or higher for 10 hours or more to remove harmful components while maintaining inorganic and mineral components. Roasted salt contains minerals such as magnesium, calcium, and potassium, and it has the property of hardening food instead of softening it; therefore, it is an ingredient that can help a fermentation process of food.

The soy sauce is fermented soybean sauce prepared by a known method using soybean paste and salt water, and has a unique taste mainly made of amino acids. As for the soy sauce, those commercially available may be used. For example, brewed soy sauce, dark soy sauce, soup soy sauce, etc. may be used, and soup soy sauce may preferably be used.

The yeast is used as a fermentation agent, and conventional yeast that may be used for fermentation may be used. For example, white yeast (*Aspergillus kawachii, Aspergillus shirousamii*, etc.), yellow yeast (*Aspergillus oryzae*, etc.), black yeast (*Aspergillus niger, Aspergillus awamori, Aspergillus usamii*, etc.), *Rhizopus* sp., etc may be used.

In an embodiment, the preliminary mixture may be prepared by adding water after mixing the mushrooms, salt, soy sauce, and yeast. Alternatively, the mushrooms, salt, soy sauce, yeast, and water may be mixed simultaneously. However, it is preferable that the ingredients be mixed first and then water be added thereafter.

In an embodiment, the contents of mushrooms, salt, soy sauce, and yeast to be included in the preliminary mixture may be 20 parts by weight to 40 parts by weight of the salt, 10 parts by weight to 30 parts by weight of the soy sauce, and 10 parts by weight to 20 parts by weight of the yeast based on 100 parts by weight of the mushrooms.

As for the water, distilled water, purified water, pure water, etc. may be used, and the water may be added until the mixture including mushrooms, salt, soy sauce, and yeast is sufficiently submerged. Thereafter, the preliminary mixture may be subjected to preliminary fermentation to prepare a preliminary fish sauce.

In an embodiment, the preliminary fermentation may be performed at room temperature for 2 months to 6 months. Preferably, the preliminary fermentation may be performed at room temperature (e.g., 5° C. to 35° C.) for 3 months to 4 months. When the yeast is fermented under the above conditions, the protease may ferment the mushrooms and increase the umami, mask the off-odor and taste, and provide enriched flavor and taste of meat. In particular, when the fermentation process is performed with the types and contents of the mushrooms used in the present invention, the umami and savory flavor of the meat may be improved, and thus may be further preferable.

In an embodiment, the preliminary mixture may further include one or more vegetables selected from paprika and bell pepper. Preferably, the preliminary mixture may include paprika, and more preferably roasted paprika. In particular, the baked paprika may be paprika baked at 100° C. to 150° C. for 2 minutes to 10 minutes.

When the preliminary mixture includes roasted paprika, it may help to add a savory taste while removing the musty aroma caused by ageing and fermentation. In addition, the content of vitamins may be further improved. In an embodiment, an amount of vegetables to be added may be 1 part by weight to 10 parts by weight with respect to 100 parts by weight of mushrooms. For example, 1 part by weight to 10 parts by weight of baked paprika may be included with respect to 100 parts by weight of mushrooms.

Then, a first fish sauce may be prepared by separating the liquid-phase and solid content from the preliminary fish sauce, and subjecting the mixture including solid content of the preliminary fish sauce, spring onion roots, and water to primary fermentation (Step S20).

First, the liquid-phase of the preliminary fish sauce may be removed, and spring onion roots may be added to the solid content of the preliminary fish sauce. The spring onion roots to be added may be 1/2 times to 1/6 times, and preferably 1/3 times to 1/4 times the solid content of the preliminary fish sauce. Spring onion roots may improve appetite and, when mixed with other ingredients, may improve a savory flavor and provide a subtle meat flavor.

In an embodiment, the first mixture may be prepared by mixing the solid content of the preliminary fish sauce with the spring onion roots and adding water thereto. Alternatively, the first mixture may be prepared by simultaneously mixing the solid content of the preliminary fish sauce, spring onion roots, and water with the first mixture. However, for the preparation of the first mixture, it is preferable that spring onion roots be first added to the solid content of the preliminary fish sauce and then water be added thereafter.

In an embodiment, the primary fermentation may be performed at room temperature for 0.5 months to 3 months. Preferably, the primary fermentation may be performed at room temperature, for example, 5° C. to 35° C. for 1 month to 2 months. The materials mixed under the above conditions may undergo further fermentation. That is, proceeding of a multi-stage fermentation (e.g., the above-described preliminary fermentation and primary fermentation) may further increase umami and provide a richer meat flavor.

Then, the liquid-phase and the solid content may be separated from the first fish sauce, and the solid content of the first fish sauce may be dried (Step S30).

The liquid-phase may be removed from the first fish sauce, and the remaining solid content of the first fish sauce may be dried at about 35° C. to 50° C. for 35 hours to 60 hours. The drying may be a process in which a target object is placed in a dryer and dried. For example, the dryer may be a hot air dryer or an infrared dryer. The infrared dryer may be a near-infrared dryer using near-infrared rays, and a process of inducing an air flow and irradiating the seasoning with near-infrared rays may be applied together.

Thereafter, the sufficiently dried solid content of the first fish sauce may be crushed or pulverized, for example with a mixer, to prepare powder having a size of 50 μm to 100 μm.

Then, a seasoning composition may be prepared by mixing the dried solid content of the first fish sauce, the liquid-phase of the preliminary fish sauce, the liquid-phase of the first fish sauce, and an extracted beet juice and subjecting the mixture to ageing (Step S40).

Through the ageing process, it is possible to provide a seasoning composition that may produce a savory flavor similar to that of animal meat while proteins present in the seasoning composition interact with each other.

For example, in the seasoning composition, 500 parts by weight to 800 parts by weight of the liquid-phase of the preliminary fish sauce, 500 parts by weight to 800 parts by weight of the liquid-phase of the first fish sauce, and 500 parts by weight to 800 parts by weight of the extracted beet juice may be included with respect to 100 parts by weight of the solid content of the dried first fish sauce. By adding the extracted beet juice, it is possible to provide a color similar to that of actual animal meat. By including the liquid-phase of the fish sauces again in the solid content of the dried first fish sauce, it is possible to improve the meat flavor and umami, and the effect of reducing off-taste and off-flavor reduction becomes also excellent.

Meanwhile, the ageing may be performed at 10° C. to 20° C. for 1 month to 5 months. Preferably, the seasoning composition may be obtained after ageing at 15° C. for 2 months to 4 months. By ageing at a low temperature in the above range, the hardness of the seasoning composition may sufficiently be increased, which is advantageous for molding food materials.

In an embodiment, the preparation of the seasoning composition may include, before the drying, mixing the solid content of the first fish sauce with a second mixture including beets, salt, iron, soy sauce, yeast, and water, and performing a secondary fermentation to prepare a second fish sauce; separating a liquid-phase and solid content from the second fish sauce; and drying the solid content of the second fish sauce to prepare a seasoning composition, wherein the ageing may include mixing the seasoning, the liquid-phase of the preliminary fish sauce, the liquid-phase of the second fish sauce, and an extracted beet juice; and subjecting the mixture to ageing.

In particular, as for the iron, PlantFusion's Vegan Complete Iron, 25 mg, 90 Vegan Capsules product may be used.

In an embodiment, the second mixture may include 200 parts by weight to 300 parts by weight of salt, 1 part by weight to 10 parts by weight of iron, 50 parts by weight to 200 parts by weight of soy sauce, and 100 parts by weight to 300 parts by weight of yeast, with respect to 1,000 parts by weight of beets. Then, water may be added to the mixture so that the ingredients are sufficiently immersed. Thereafter, a secondary fish sauce may be prepared by subjecting the second mixture to a secondary fermentation.

For example, the secondary fermentation may be performed at room temperature for 2 months to 6 months. Preferably, the secondary fermentation may be performed at room temperature (e.g., 5° C. to 35° C.) for 3 to 4 months. Under the above conditions, the taste and aroma of meat may be provided more strongly, and a savory flavor similar to that of meat may be provided when the seasoning composition is used.

In some embodiments, a mixing ratio of the mixture obtained by secondary fermentation of the second mixture to the solid content of the first fish sauce may be 1/2 times to 2 times.

In an embodiment, the preparation of the seasoning composition may include, before the drying: mixing the solid content of the first fish sauce with a third mixture including the liquid-phase of the preliminary fish sauce, spring onion roots, and water, and subjecting the resulting mixture to a tertiary fermentation to prepare a third fish sauce; separating a liquid-phase and solid content from the third fish sauce; and drying the solid content of the third fish sauce to prepare a seasoning, wherein the ageing may include mixing the seasoning, the liquid-phase of the preliminary fish sauce, the liquid-phase of the third fish sauce, and an extracted beet juice; and subjecting the mixture to ageing.

For example, the tertiary fermentation may be performed at room temperature for 0.5 months to 3 months. Preferably, the tertiary fermentation may be performed at room temperature (e.g., 5° C. to 35° C.) for 1 month to 2 months. Under the above conditions, it is possible to provide a savory flavor similar to that of meat.

In some embodiments, the mixing ratio of the mixture obtained by tertiary fermentation of the third mixture to the solid content of the first fish sauce may be 1/2 times to 2 times.

In some embodiments, the seasoning composition may further include salt, an acidity regulator, vegetable oil, pigments, etc. so as to adjust the texture, savory flavor, and color of the composition.

According to an embodiment, a food including the seasoning composition according to the preparation method described above may be provided.

Hereinafter, experimental examples including preferred examples and comparative examples are suggested to aid the understanding of the present invention, but these examples are only illustrative of the present invention and do not limit the scope of the appended claims, and it is apparent to those skilled in the art that various changes and modifications to these examples are possible within the scope of the present invention and scope of the technical idea, and it is also natural that these changes and modifications fall within the scope of the appended claims.

EXAMPLE 250 g of oyster mushroom, 250 g of king oyster mushroom, and 500 g of button mushroom were minced, and then, 240 g of baked salt, 50 g of baked smoked paprika, 200 g of soup soy sauce, and 200 g of yeast were mixed therewith, and the resultant was filled with water, and fermented at 25° C. for 3 months to prepare a preliminary fish sauce.

The liquid-phase and the solid content were separated from the preliminary fish sauce, and 500 g of spring onion roots were added to the solid content of the preliminary fish sauce, and the resultant was filled with water, and fermented at 15° C. for one month to prepare a first fish sauce.

The liquid-phase and the solid content were separated from the first fish sauce, and the solid content of the first fish sauce was dried at 40° C. for 48 hours, and then ground in a blender to prepare a seasoning.

100 g of the liquid-phase of the preliminary fish sauce, 200 g of the liquid-phase of the first fish sauce, 15 g of the solid content of the first fish sauce, and 100 g of an extracted beet juice were mixed and cured at 15° C. for 3 months to prepare a seasoning composition. The seasoning composition was added into vegetable substitute meat and thereby a vegetable substitute meat patty including the seasoning composition of the present invention was prepared.

Comparative Example

Beef patties sold at commercial marts were used as comparative examples.

Experimental Example 1: Measurement of Chromaticity

L (brightness), a (redness), and b (yellowness) values of the patties of Example and Comparative Example were measured using a colorimetric meter (Chroma Meter CR-400, Konica Minolta, Inc., Japan) by setting the White Standard Plate (Y=85.6, x=0.3156, y=0.3213) as the standard. In the case of the comparison value ΔE representing a color difference, the comparison was made based on beef patties. Each measured value represents an average value shown after 10 repeated measurements. The results are shown in Table 1 below.

TABLE 1

| Category | L | A | B | ΔE |
|---|---|---|---|---|
| Example | 36.5 | 12.59 | 20.07 | 5.91 |
| Comparative Example | 40.12 | 9.58 | 18.99 | — |

Referring to Table 1, it can be seen that the color difference between Example and the Comparative Example is 5.91, and the external colors are similar.

Experimental Example 2: Sensory Evaluation

After baking the patties of Example and Comparative Example, sensory evaluation was performed on 100 adult men and women. The scale of taste and preference was scored out of 10 points. The results are shown in Table 2 below.

TABLE 1

| Category | Taste | Savory Flavor | Preference |
|---|---|---|---|
| Example | 8.3 | 8.0 | 7.5 |
| Comparative Example | 8.4 | 8.9 | 7.7 |

Referring to Table 2, it can be seen that Example has no significant difference in taste and savory flavor from Comparative Example, and has a similar level of preference. Therefore, it can be expected that the food according to the present invention can replace animal meat by providing taste, color, and palatability close to actual animal meat.

The method for preparing a seasoning composition according to the present invention may provide a seasoning composition that provides a blood flavor and a savory flavor of animal meat without using any meat. For example, animal meat may be replaced by providing a seasoning composition that may achieve a taste and a color close to those of actual animal meat.

The effects of the present invention are not limited to those described above, and other effects not described will be clearly understood by those skilled in the art from the description above.

What is claimed is:

1. A method for preparing a seasoning composition, comprising:
   - preparing a preliminary fermented sauce by performing preliminary fermentation of a preliminary mixture comprising mushrooms, salt, soy sauce, yeast, and water;
   - separating a liquid-phase and a solid content from the preliminary fermented sauce and performing primary fermentation of a first mixture comprising the solid content of the preliminary fermented sauce, spring onion roots, and water to prepare a first fermented sauce;
   - separating a liquid-phase and a solid content from the first fermented sauce and drying the solid content of the first fermented sauce to prepare a seasoning; and
   - mixing the seasoning, the liquid-phase of the preliminary fermented sauce, the liquid-phase of the first fermented sauce, and an extracted beet juice, and subjecting the mixture thereof to aging.

2. The method of claim 1, wherein the preliminary mixture is prepared by mixing mushrooms, salt, soy sauce, and yeast and then adding water thereto.

3. The method of claim 1, wherein the preliminary fermentation is performed at room temperature for 2 months to 6 months.

4. The method of claim 1, wherein the mushrooms comprise one or more selected from oyster mushroom, button mushroom, king oyster mushroom, enoki mushroom, and shiitake mushroom.

5. The method of claim 1, wherein the preliminary mixture further comprises one or more selected from paprika and bell pepper.

6. The method of claim 1, wherein the first mixture is prepared by mixing the solid content of the preliminary fermented sauce and the spring onion roots and then adding the water thereto.

7. The method of claim 1, wherein the primary fermentation is performed at room temperature for 0.5 months to 3 months.

8. The method of claim 1, wherein the drying is performed at 35° C. to 50° C. for 35 hours to 60 hours.

9. The method of claim 1, wherein the seasoning composition comprises 500 parts by weight to 800 parts by weight of the liquid-phase of the preliminary fermented sauce, 500 parts by weight to 800 parts by weight of the liquid-phase of the first fermented sauce, and 500 parts by weight to 800 parts by weight of the extracted beet juice with respect to 100 parts by weight of the seasoning prepared by drying the solid content of the first fermented sauce.

10. The method of claim 1, wherein the aging is performed at 10° C. to 20° C. for 1 months to 5 months.

11. A method for preparing a seasoning composition, comprising:
    - preparing a preliminary fermented sauce by performing preliminary fermentation of a preliminary mixture comprising mushrooms, salt, soy sauce, yeast, and water;
    - separating a liquid-phase and a solid content from the preliminary fermented sauce and performing primary fermentation of a first mixture comprising the solid content of the preliminary fermented sauce, spring onion roots, and water to prepare a first fermented sauce;
    - separating a liquid-phase and a solid content from the first fermented sauce and mixing the solid content of the first fermented sauce with a second mixture comprising beets, salt, iron, soy sauce, yeast, and water, and performing secondary fermentation to prepare a second fermented sauce;
    - separating a liquid-phase and a solid content from the second fermented sauce and drying the solid content of the second fermented sauce to prepare a seasoning; and
    - mixing the seasoning, the liquid-phase of the preliminary fermented sauce, the liquid-phase of the second fermented sauce, and an extracted beet juice, and subjecting the mixture thereof to aging.

12. A method for preparing a seasoning composition, comprising:
    - preparing a preliminary fermented sauce by performing preliminary fermentation of a preliminary mixture comprising mushrooms, salt, soy sauce, yeast, and water;
    - separating a liquid-phase and a solid content from the preliminary fermented sauce and performing primary fermentation of a first mixture comprising the solid content of the preliminary fermented sauce, spring onion roots, and water to prepare a first fermented sauce;
    - separating a liquid-phase and a solid content from the first fermented sauce and mixing the solid content of the first fermented sauce with a second mixture comprising the liquid-phase of the preliminary fermented sauce, spring onion roots, and water, and performing secondary fermentation to prepare a second fermented sauce;
    - separating a liquid-phase and a solid content from the second fermented sauce and drying the solid content of the second fermented sauce to prepare a seasoning; and
    - mixing the seasoning, the liquid-phase of the preliminary fermented sauce, the liquid-phase of the second fermented sauce, and an extracted beet juice, and subjecting the mixture thereof to aging.

* * * * *